US011724745B1

(12) United States Patent
Ebrahimi Afrouzi et al.

(10) Patent No.: US 11,724,745 B1
(45) Date of Patent: Aug. 15, 2023

(54) INTEGRATED BUMPER

(71) Applicants: Ali Ebrahimi Afrouzi, Henderson, NV (US); Alexander Powers, Dublin, CA (US); Shahin Fathi Djalali, San Leandro, CA (US)

(72) Inventors: Ali Ebrahimi Afrouzi, Henderson, NV (US); Alexander Powers, Dublin, CA (US); Shahin Fathi Djalali, San Leandro, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 17/883,524

(22) Filed: Aug. 8, 2022

Related U.S. Application Data

(63) Continuation of application No. 17/072,252, filed on Oct. 16, 2020, now Pat. No. 11,440,592, which is a continuation of application No. 16/212,468, filed on Dec. 6, 2018, now Pat. No. 10,843,735, which is a continuation of application No. 15/924,174, filed on Mar. 16, 2018, now Pat. No. 10,183,701.

(60) Provisional application No. 62/473,362, filed on Mar. 18, 2017.

(51) Int. Cl.
| | |
|---|---|
| *B62D 24/04* | (2006.01) |
| *A47L 9/00* | (2006.01) |
| *B62D 27/04* | (2006.01) |
| *A47L 11/40* | (2006.01) |
| *G05D 1/02* | (2020.01) |

(52) U.S. Cl.
CPC ............. *B62D 24/04* (2013.01); *A47L 9/009* (2013.01); *A47L 11/4066* (2013.01); *B62D 27/04* (2013.01); *G05D 1/021* (2013.01); *G05D 2201/0203* (2013.01)

(58) Field of Classification Search
CPC ......... B62D 24/04; B62D 27/04; A47L 9/009; A47L 11/4066; G05D 1/021; G05D 2201/0203
See application file for complete search history.

(56) References Cited

U.S. PATENT DOCUMENTS

| | | | | |
|---|---|---|---|---|
| 7,647,144 | B2 * | 1/2010 | Haegermarck | G05D 1/0227 15/340.1 |
| 8,390,251 | B2 * | 3/2013 | Cohen | B25J 19/005 320/109 |
| 8,584,307 | B2 * | 11/2013 | Won | G05D 1/0227 15/340.1 |
| 2008/0065265 | A1 * | 3/2008 | Ozick | G05D 1/0227 901/1 |
| 2016/0235270 | A1 * | 8/2016 | Santini | A47L 11/4013 |

FOREIGN PATENT DOCUMENTS

| | | | | |
|---|---|---|---|---|
| CN | 104350441 | A * | 2/2015 | .......... A47L 11/4011 |
| CN | 205403810 | U * | 7/2016 | .......... A47L 11/4061 |

* cited by examiner

*Primary Examiner* — Lori L Lyjak

(57) ABSTRACT

Provided is a bumper apparatus of a robot, including: a bumper elastically coupled with a chassis of the robot; and at least one elastic element coupled to or interfacing with both the chassis and the bumper; wherein: the at least one elastic element facilitates movement of the bumper relative to the chassis upon impact with an object and disengagement from the object after impact; the at least one elastic element facilitates a return of the bumper to a neutral position upon disengaging from the object after impact; and the bumper covers at least a portion of the chassis.

19 Claims, 4 Drawing Sheets

INTEGRATED BUMPER

CROSS-REFERENCE TO RELATED APPLICATIONS

This application is a Continuation of U.S. Non-Provisional patent application Ser. No. 17/072,252, filed Oct. 16, 2020, which is a Continuation of U.S. Non-Provisional patent application Ser. No. 16/212,468, filed Dec. 6, 2018, which is a Continuation of U.S. Non-Provisional patent application Ser. No. 15/924,174, filed Mar. 16, 2018, which claims the benefit of U.S. Provisional Patent Application No. 62/473,362, filed Mar. 18, 2017, all of which are herein incorporated by reference in their entireties for all purposes.

FIELD OF THE DISCLOSURE

Embodiments disclosed related to integrated bumpers for robotic devices, specifically inconspicuous bumper/cover for robotic vacuum devices.

BACKGROUND

Robotic devices are becoming more common in everyday life. Initially, robotic devices emphasized function over form. It was once common to see robotic devices with exposed gears and mechanisms. In a more mature marketplace, however, form has become more important so as to attract more consumers. The idea of inconspicuous bumper is about unifying the appearance of a bumper of a robot device, such as a robotic vacuum device, to improve the aesthetic of the device. In addition, functionality may be incorporated into the design to enhance usability. In this manner, both form and function may be addressed. As such, embodiments for integrated bumpers are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a bumper apparatus of a robot, including: a bumper elastically coupled with a chassis of the robot; and at least one elastic element coupled to or interfacing with both the chassis and the bumper; wherein: the at least one elastic element facilitates movement of the bumper relative to the chassis upon impact with an object and disengagement from the object after impact; the at least one elastic element facilitates a return of the bumper to a neutral position upon disengaging from the object after impact; and the bumper covers at least a portion of the chassis.

Some aspects provide a robot including the above-described bumper apparatus.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Non-limiting and non-exhaustive features of the present invention are described with reference to the following figures, wherein like reference numerals refer to like parts throughout the various figures.

DETAILED DESCRIPTION OF SOME EMBODIMENTS

Embodiments of the present invention will now be described in detail with reference to a few embodiments thereof as illustrated in the accompanying drawings. In the following description, numerous specific details are set forth in order to provide a thorough understanding of specific embodiments of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1A:
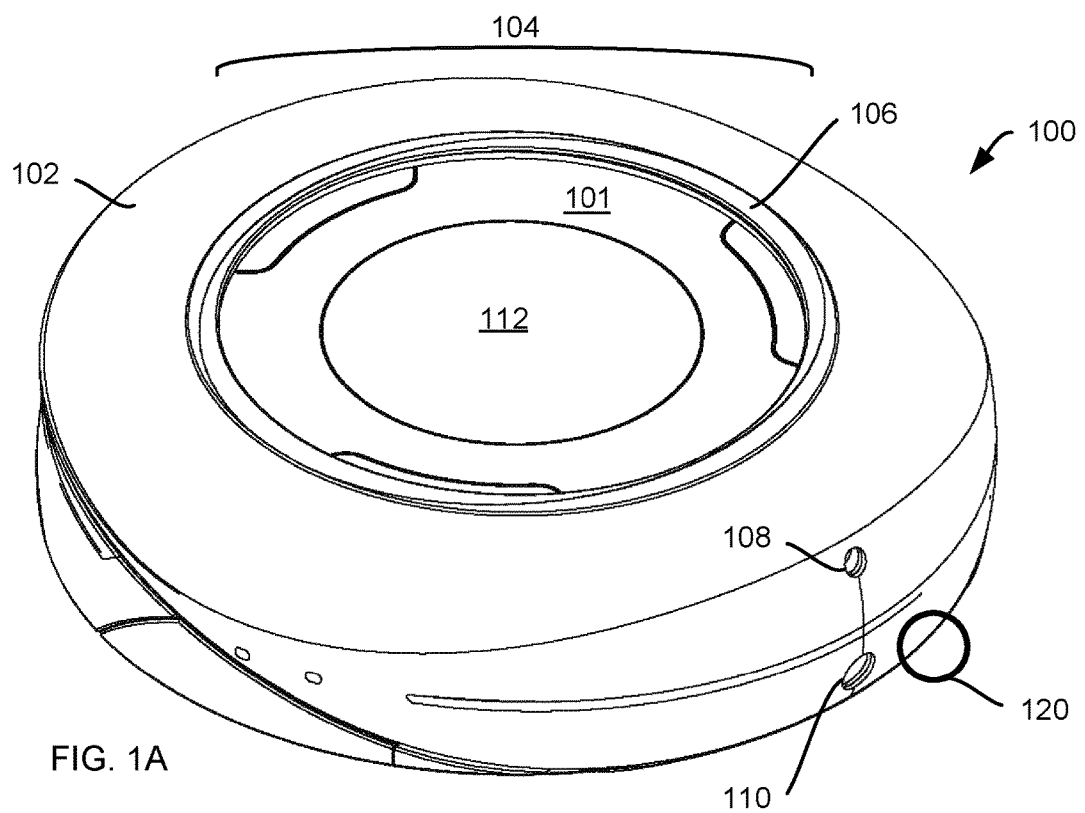
FIGS. 1A-1B are illustrative orthogonal representations of an integrated bumper, according to some embodiments.
Figure 1B:
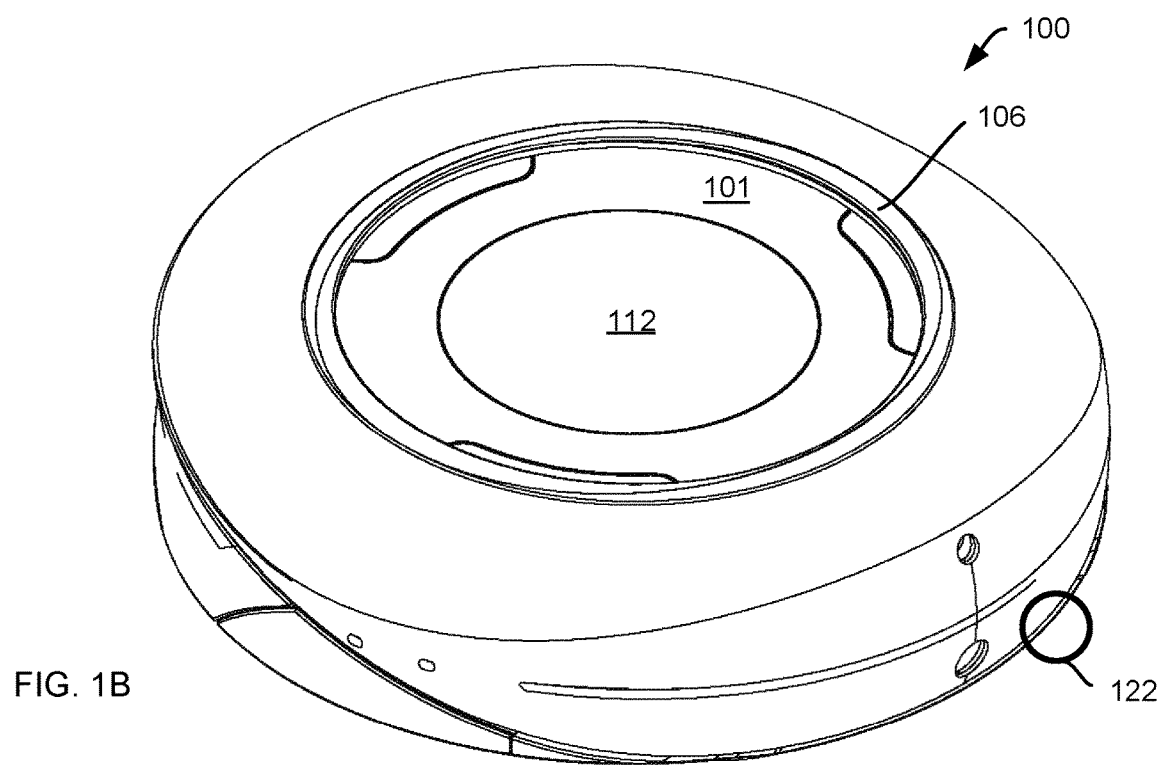

FIGS. 1A-1B are illustrative orthogonal representations of an integrated bumper embodying features of the present invention. FIG. 1A presents integrated bumper 100 in a neutral or resting position. That is, before integrated bumper embodiments engage with, for example, an object or obstacle. The integrated bumper may be circular or oval in shape or may comprise other shapes suitable to the robotic device, such u-shaped, squared, or rectangular. In some embodiments, integrated bumper 100 may include user interface opening 104 disposed along a top surface of cover 102 and bridging element 106 that covers the gap between cover 102 and an installed user interface frame 101 framing user interface 112. In some embodiments, the bridging element may comprise a circular or oval ring. In other embodiments, the bridging element may be in the shape of a curvilinear polygon or other shapes suitable to the robotic device. Further illustrated are side ports 108 and 110 corresponding with sensors of a robotic device. Any number of side port embodiments may be positioned in any manner without limitation. Embodiments disclosed herein provide a cover that partially encloses a robotic device chassis as well as fully enclosing a suspension assembly. An example robotic device chassis will be discussed in further detail below for FIGS. 3A and 3B. In addition, suspension assemblies will be discussed in further detail below for FIG. 4.

FIG. 1B presents integrated bumper 100 in an impact position. That is, after integrated bumper embodiments engage with, for example, an object or obstacle. In comparing FIG. 1A at 120 with FIG. 1B at 122, it may be seen that the cover moves slightly when impacted. However, because the cover is suspended, user interface 112 and bridging element 106 remain in the same position in response to movement or impact. This configuration provides an inconspicuous bumper/cover that is responsive to obstacles.

Figure 2A:
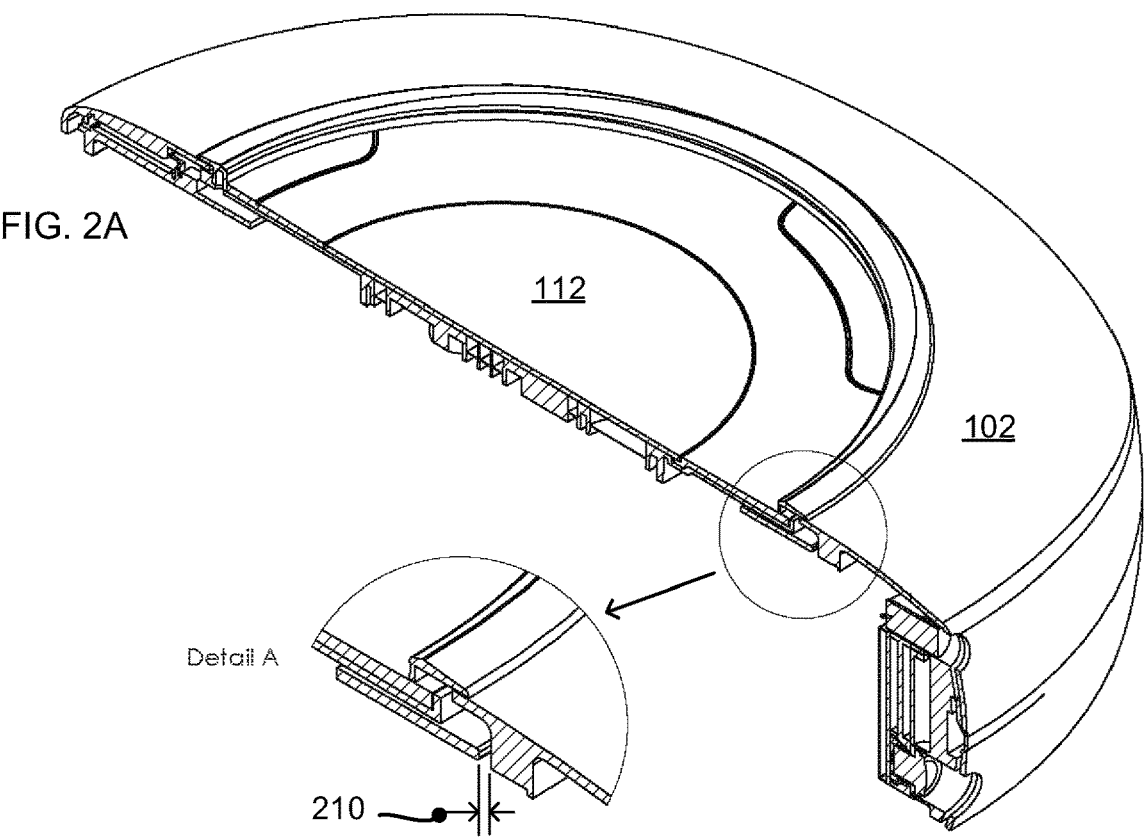
FIGS. 2A-2B are illustrative cut away representations of an integrated bumper implemented on a robotic device, according to some embodiments.
Figure 2B:
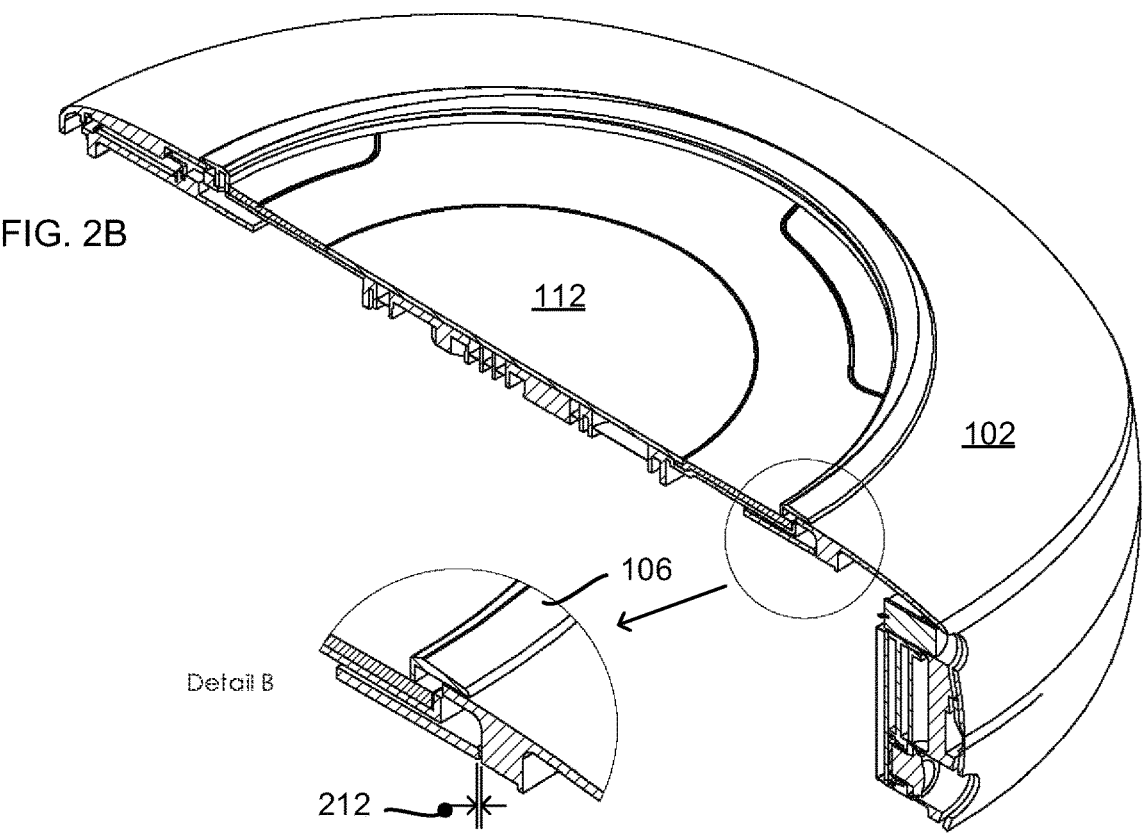

FIGS. 2A-2B are illustrative cut away representations of an integrated bumper embodying features of the present invention. These cut away representations are provided for clarity in understanding embodiments disclosed herein. FIG. 2A presents an integrated bumper in a neutral or resting position. That is, before integrated bumper embodiments engage with, for example, an object or obstacle. In addition, FIG. 2B presents an integrated bumper in an impact position. That is, after integrated bumper embodiments engage with, for example, an object or obstacle. In comparing FIG. 2A at 210 with FIG. 2B at 212, it may be seen that cover 102 moves slightly when impacted. In some embodiments, the movement is less than approximately 5.0 mm. However, because cover 102 is suspended, user interface 112 and bridging element 106 remain in the same position in response to movement or impact. This configuration provides an inconspicuous bumper/cover that is responsive to obstacles.

It may be appreciated that the bumper/cover and bridging elements may be enabled in a variety of ways. For example, in one embodiment, the bridging element and the cover are a unitary element that moves separately from the user interface during movement or impact. In this embodiment, the bridging element and the cover may be mechanically bonded or may be formed together. In addition, the bridging element may be positioned either above, level with, or below the cover surface in embodiments. In another embodiment, the bridging element and the user interface are a unitary element that moves separately from the cover during movement or impact. In this embodiment, the bridging element and the user interface may be mechanically bonded or may be formed together. In addition, the bridging element may be positioned either above, level with, or below the user interface in embodiments.

Figure 3A:
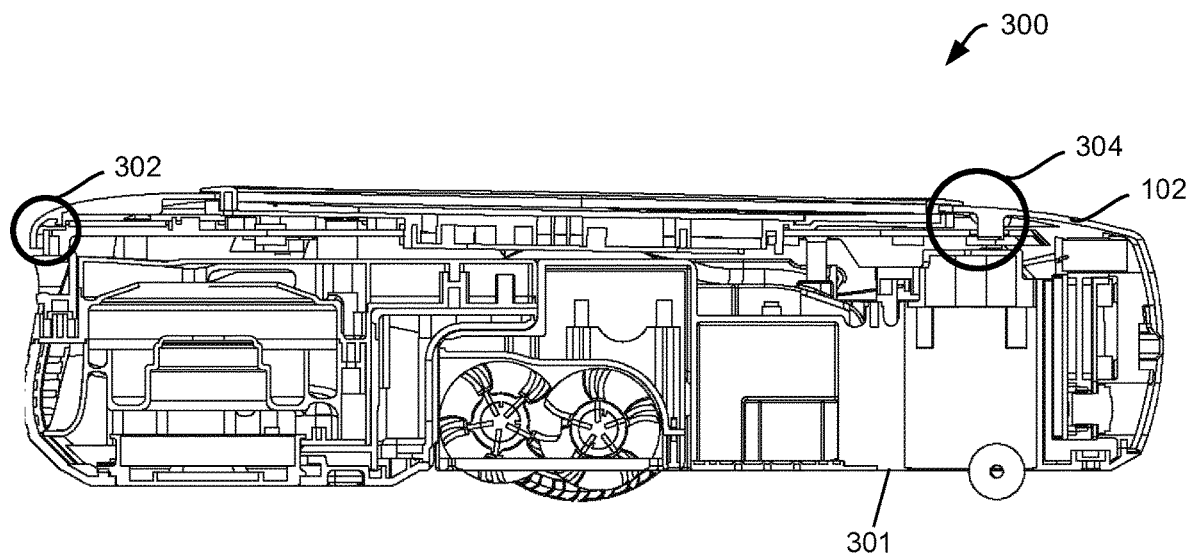
FIGS. 3A-3B are illustrative cross-sectional representations of an integrated bumper, according to some embodiments.
Figure 3B:
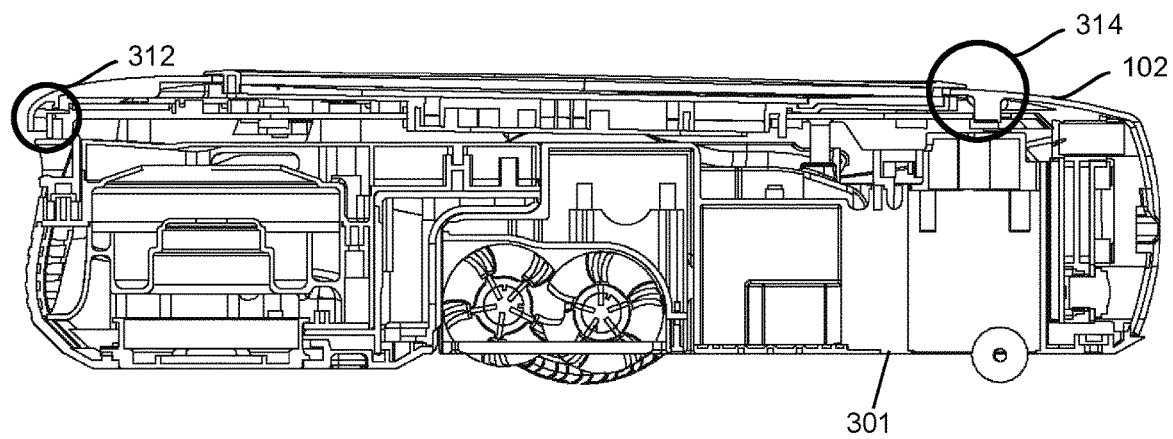

FIGS. 3A-3B are illustrative cross-sectional representations of an integrated bumper implemented on a robotic device embodying features of the present invention. In embodiments, the robotic device is an autonomous or semi-autonomous robotic vacuum device. These cross-sectional representations are provided for clarity in understanding embodiments disclosed herein. FIG. 3A presents an integrated bumper implemented on a robotic device 300 with a chassis 301 in a neutral or resting position. That is, before integrated bumper embodiments engage with, for example, an object or obstacle. In addition, FIG. 3B presents an integrated bumper implemented on a robotic device in an impact position. That is, after integrated bumper embodiments engage with, for example, an object or obstacle. In comparing FIG. 3A at 302 and 304 with FIG. 3B at 312 and 314 respectively, it may be seen that cover 102 moves slightly when impacted. As such, this configuration provides an inconspicuous bumper/cover that is responsive to obstacles.

Figure 4:
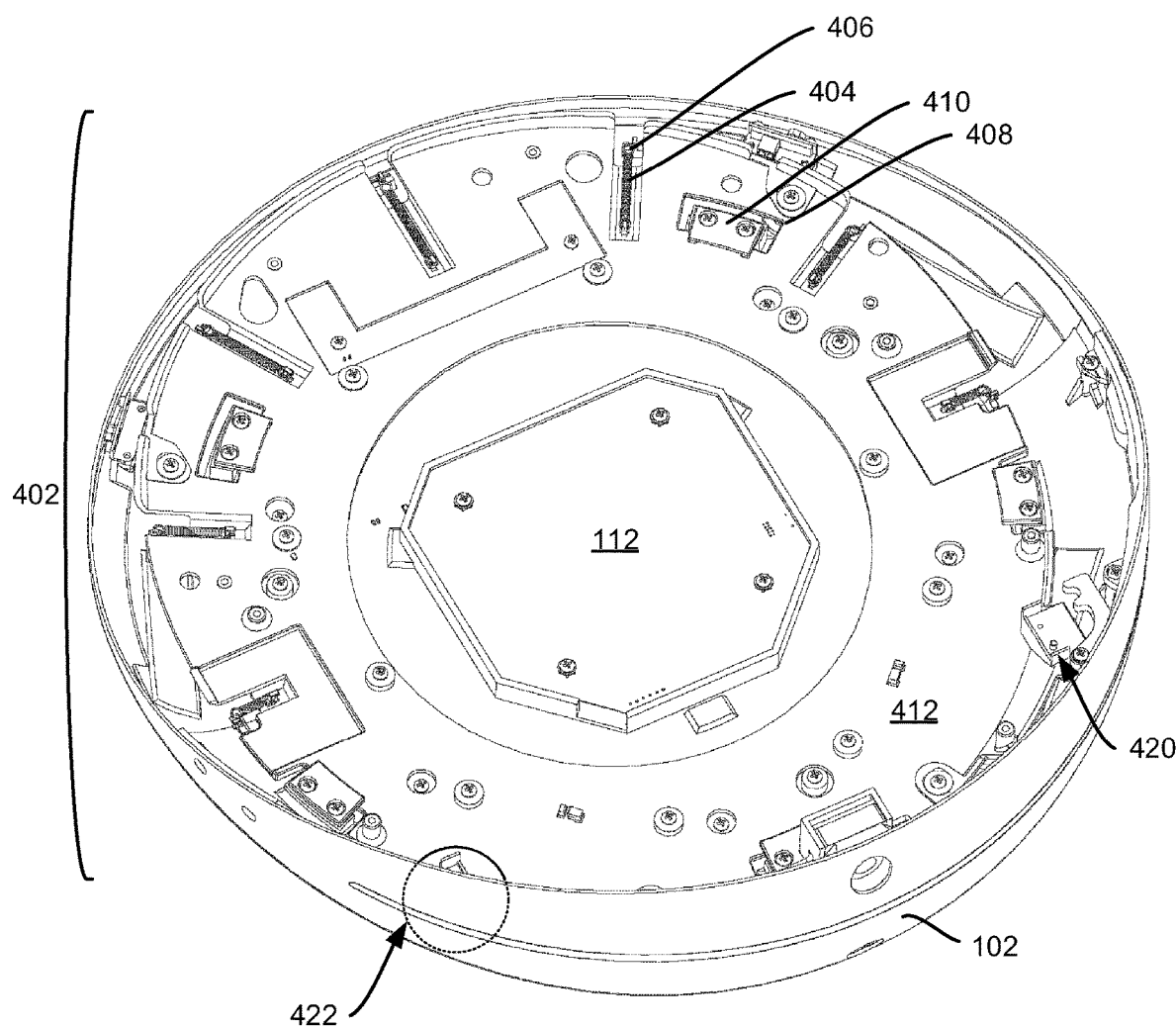
FIG. 4 is an illustrative orthogonal underside representation of an integrated bumper, according to some embodiments.

FIG. 4 is an illustrative orthogonal underside representation of an integrated bumper embodying features of the present invention. As illustrated, embodiments include suspension assembly 402. Suspension assembly 402 includes suspension plate 412 that may be coupled with a top surface of a robotic device chassis (see FIGS. 3A and 3B for example). In addition, a number of radially disposed springs 404 may be positioned along a portion of the circumference of suspension plate 412 and coupled therewith. In embodiments, springs may be substantially similar. In other embodiments, springs may differ in length and spring tension. It may be advantageous, in some embodiments to select different springs to accommodate different weight distributions of integrated bumper embodiments. The embodiment illustrated includes seven springs positioned along a portion of the circumference of suspension plate, however, any number of springs may be utilized without limitation and without departing from embodiments provided herein. Further illustrated, suspension assembly 402 may include a number of cutouts 408 positioned along a circumference of suspension plate 412.

In addition to the suspension assembly, cover 102 is illustrated that includes a number of spring anchors 406 coupled with the radially disposed springs 404 to suspend the cover and a number of tabs 410 aligned with cutouts 408 to limit movement of the cover. In this configuration, the cover may move separately from the user interface 112 in response to an impact. In embodiments, spring anchors are utilized to mechanically couple a spring or other expandable element such as, for example, a rubber strip or band with the cover. Any type of spring anchor known in the art may be utilized without limitation and without departing from embodiments disclosed herein. Further, in embodiments, tabs and cutouts cooperatively function to retain the cover and to limit movement of the cover with respect to the robotic device chassis. The size and shape of both the tabs and cutouts may be selected to limit movement to a desired specification without limitation and without departing from embodiments disclosed herein. In addition, tabs may be manufactured with a rigid material to provide a hard stop or may be manufactured from a flexible or semi-rigid material for a softer stop. In order to determine where the impact occurs, two impact sensors 420 and 422 may be positioned along a second portion of the circumference of the suspension plate that does not include springs 404. These impact sensors detect movement between the suspension assembly and the cover and may provide at least some indication of the direction from which the impact with an object or obstacle occurs. The following table is provided to illustrate the sensor conditions and relative direction of impact:

TABLE 1

| | Condition | Condition | Condition |
|---|---|---|---|
| Sensor 1 | $on_1$ | $on_1$ | $off_1$ |
| Sensor 2 | $on_2$ | $off_2$ | $on_2$ |
| Direction | Front Impact | Impact local to sensor 1 | Impact local to sensor 2 |

It may be noted that the location of the impact sensors may be optimally placed forward in the prevailing direction of travel of the robotic device but may also be placed in other locations. In some embodiments, additional impact sensors may be likewise utilized to provide more refined impact direction information.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

The invention claimed is:

1. A bumper apparatus of a robot, comprising:
a bumper elastically coupled with a chassis of the robot;
at least one impact sensor configured to detect movement of the bumper; and
at least one elastic element coupled to or interfacing with both the chassis and the bumper;
wherein:
the at least one elastic element facilitates movement of the bumper relative to the chassis upon impact with an object and disengagement from the object after impact;
the at least one elastic element facilitates a return of the bumper to a neutral position upon disengaging from the object after impact; and
the bumper covers at least a portion of the chassis.

2. The bumper apparatus of claim 1, wherein the portion of the chassis the bumper covers in includes at least a front side, a portion of a left side, a portion of a right side, and a portion of a top side of the chassis.

3. The bumper apparatus of claim 2, wherein:
the bumper comprises an opening in a top surface of the bumper;
the robot comprises a user interface; and
the user interface is positioned within the opening.

4. The bumper apparatus of claim 3, wherein:
the robot comprises a user interface frame framing the user interface; and
the user interface frame is positioned within the opening.

5. The bumper apparatus of claim 3, wherein:
the bumper apparatus further comprises a bridging element coupled with the chassis or another component of the robot;
the bumper slides relative to the bridging element upon the impact with the object and upon the disengagement from the object;

an edge of the bumper defining the opening is hidden beneath a portion the bridging element when the bumper is in the neutral position; and
the edge of the bumper defining the opening is hidden beneath the portion of the bridging element during movement of the bumper caused by the impact and during movement of the bumper while disengaging from the object until reaching the neutral position.

6. The bumper apparatus of claim 5, wherein:
the robot comprises a user interface;
the robot comprises a user interface frame framing the user interface;
the another component comprises the user interface frame; and
the bumper slides relative to the user interface, the user interface frame, and the bridging element during movement of the bumper caused by the impact and during movement of the bumper while disengaging from the object until reaching the neutral position.

7. The bumper apparatus of claim 6, wherein the bridging element is coupled with the user interface frame along an outer edge of the user interface frame.

8. The bumper apparatus of claim 6, wherein the user interface, the user interface frame, and the bridging element are manufactured as a single component.

9. The bumper apparatus of claim 1, further comprising a mechanism for limiting an amount of movement of the bumper.

10. The bumper apparatus of claim 9, wherein the mechanism comprises:
at least one tab coupled to the bumper; and
at least one stopping element coupled to the chassis or another component of the robot;
wherein movement of the bumper is limited by physical contact of the at least one tab against the at least one stopping element.

11. The bumper apparatus of claim 1, wherein the at least one elastic element comprises one or more of: a spring, a rubber piece, a spring clip, and an elastic band.

12. The bumper apparatus of claim 1, wherein the at least one impact sensor is coupled to the chassis on a first end and interfaces with the bumper on a second end.

13. The bumper apparatus of claim 1, wherein:
the at least one impact sensor detects six conditions upon the impact with the object; and
the at least six conditions indicate at least a front impact, a front-right side impact, a front-left side impact, a back impact, a back-right side impact, and a back-left side impact.

14. The bumper apparatus of claim 1, wherein the bumper comprises a plurality of openings positioned to correspond with positions of a plurality of sensors.

15. A robot, comprising:
a chassis;
a user interface;
a plurality of sensors comprising at least one impact sensor; and
a bumper apparatus, comprising:
a bumper elastically coupled with the chassis of the robot; and
at least one elastic element coupled to or interfacing with both the chassis and the bumper;
wherein:
the at least one elastic element facilitates movement of the bumper relative to the chassis upon impact with an object and disengagement from the object after impact;

the at least one elastic element facilitates a return of the bumper to a neutral position upon disengaging from the object after impact;

the at least one impact sensor is configured to detect movement of the bumper; and the bumper covers at least a portion of the chassis.

16. The robot of claim 15, wherein:

the portion of the chassis the bumper covers in includes at least a front side, a portion of a left side, a portion of a right side, and a portion of a top side of the chassis;

the bumper comprises an opening in a top surface of the bumper;

the robot comprises a user interface; and the user interface is positioned within the opening.

17. The robot of claim 16, wherein:

the bumper apparatus further comprises a bridging element coupled with the chassis or another component of the robot;

the bumper slides relative to the bridging element upon the impact with the object and upon the disengagement from the object;

an edge of the bumper defining the opening is hidden beneath a portion the bridging element when the bumper is in the neutral position; and the edge of the bumper defining the opening is hidden beneath the portion of the bridging element during movement of the bumper caused by the impact and during movement of the bumper while disengaging from the object until reaching the neutral position.

18. The robot of claim 17, wherein:

the robot further comprises a user interface frame framing the user interface;

the another component comprises the user interface frame; and the bumper slides relative to the user interface, the user interface frame, and the bridging element during movement of the bumper caused by the impact and during movement of the bumper while disengaging from the object until reaching the neutral position.

19. The robot of claim 15, wherein the bumper apparatus further comprises a mechanism for limiting an amount of movement of the bumper, comprising:

at least one tab coupled to the bumper; and at least one stopping element coupled to the chassis or another component of the robot;

wherein movement of the bumper is limited by physical contact of the at least one tab against the at least one stopping element.

* * * * *